C. R. RAGSDALE.
TIRE PROTECTOR.
APPLICATION FILED JUNE 2, 1910.
1,005,873.
Patented Oct. 17, 1911.
2 SHEETS—SHEET 1.
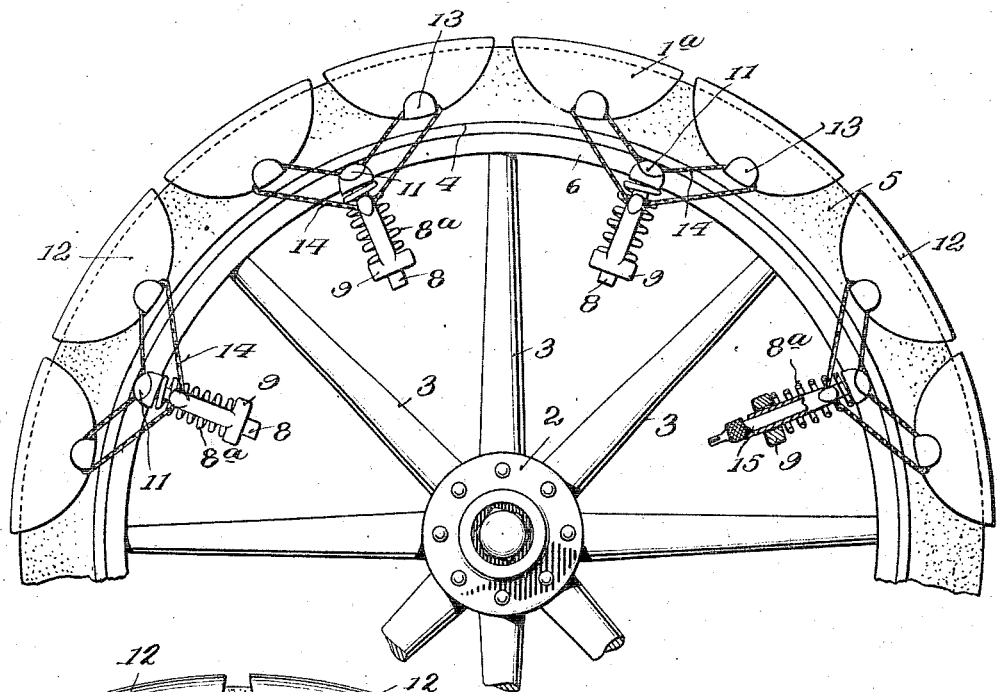
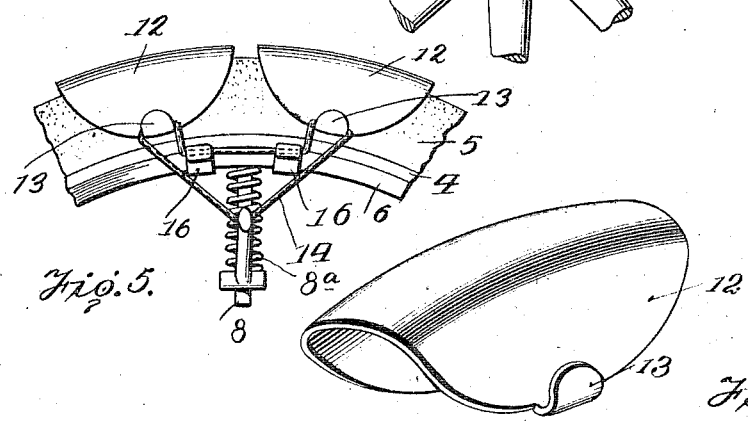
Witnesses
Inventor
Charles R. Ragsdale
By
Attorney

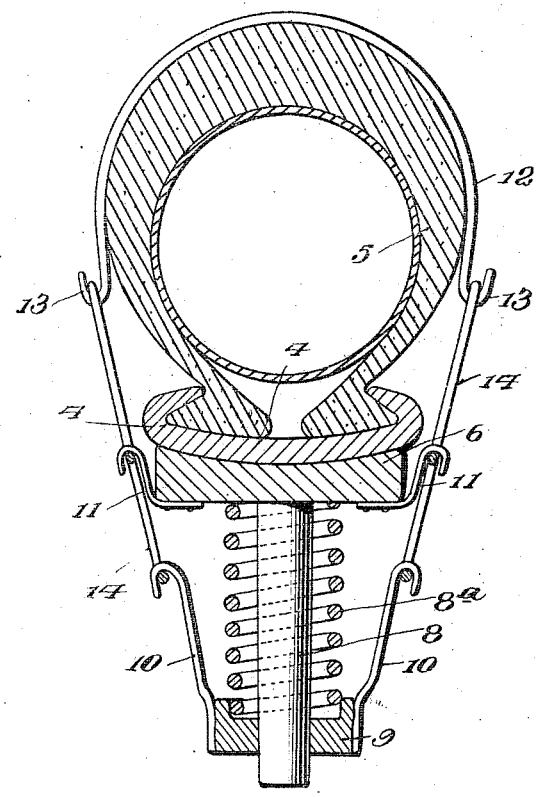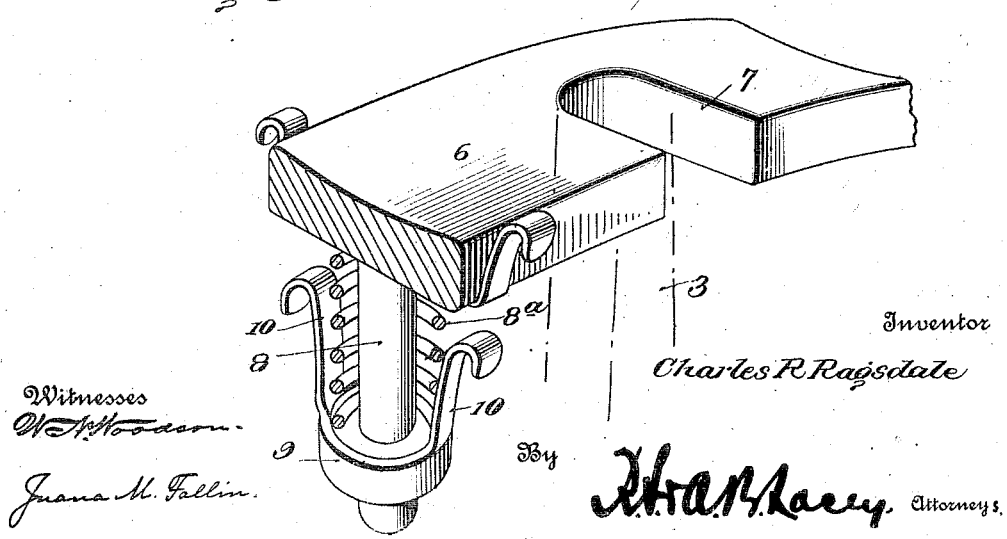

UNITED STATES PATENT OFFICE.

CHARLES R. RAGSDALE, OF ST. LOUIS, MISSOURI.

TIRE-PROTECTOR.

1,005,873.  Specification of Letters Patent.  Patented Oct. 17, 1911.

Application filed June 2, 1910. Serial No. 564,546.

*To all whom it may concern:*

Be it known that I, CHARLES R. RAGSDALE, citizen of the United States, residing at the city of St. Louis, in the State of Missouri, have invented certain new and useful Improvements in Tire-Protectors, of which the following is a specification.

My invention relates to tire protectors of that class in which a plurality of metal shields are supported upon the tread surface of a pneumatic tire, said shields being held in place so as to conform to the deflection of the tire, and so as to fit the tire snugly and firmly, and yet be readily detachable.

The primary object of my invention is to provide an improved tire protector of this character of a very simple and effective form in which the shields of protecting sections are held in firm engagement with the rubber tire by means of an internal rim disposed within the main rim of the wheel, and in which the protective sections are connected to this internal rim so as to prevent the sections from creeping.

A further object is to provide a means whereby the tire protector may be easily and quickly applied to a wheel and to the tire thereon and as easily removed, and further to provide means which while snugly holding the protecting sections or shields in engagement with the tire, will permit said sections to have a certain freedom of movement so that they may conform to the constantly changing shape of the tire.

My invention is shown in the accompanying drawings wherein:

Figure 1 is a fragmentary side elevation of a wheel equipped with my improved tire protectors. Fig. 2 is an enlarged section through the pneumatic tire of a wheel and the rim thereof, and showing my improved tire protecting plates. Fig. 3 is a perspective detail view of the internal rim or annular member detached from the wheel. Fig. 4 is a perspective view of one of the tire shields. Fig. 5 is a fragmentary side elevation of a modified form of my tire protector and the attaching means therefor.

Referring to these figures 2 designates a vehicle wheel of any suitable construction and having the spokes 3 and the usual rim 4, upon which is mounted the pneumatic tire 5 of any desired form or character.

My invention comprises a ring or annular member 6 which is intended to fit inside of the wheel rim 4, and to that end is formed with the transversely extending slots 7 which extend in from one edge of the ring plate 6 to a point slightly beyond the median line of the plate. These slots 7 are for the purpose of permitting the ring plate 6 to be slipped past the outer ends of the spokes 3. The ring plate 6 is provided with a plurality of inwardly extending posts 8, these posts being disposed midway between the slots 7 so as to have a position midway between the spokes 3 of the wheel. These posts are similar to stud bolts and are rigidly attached to the ring 6. Surrounding each post is a coiled spring $8^a$ which bears against a shiftable sleeve 9 which is provided with oppositely disposed hooks 10 extending toward the ring plate. The ring plate 6 is also provided on opposite sides in line with each post with the oppositely disposed hooks 11 which extend beyond the face of the ring plate.

The tire protector proper consists of a plurality of shields 12 of metal approximately elliptical in form and curved to conform to the tread of the tire, the lateral extremities of the shield being formed with the outwardly turned hooks 13. In order to connect the shields 12 with the hooks 10 and 11 I provide the wire rope loops 14. Each loop preferably connects two of the shields 12 with one of the hooks 11 and with one of the hooks 10, as shown in Fig. 1. The wire loop is placed over the hooks 13 of two adjacent shields at both the inner and outer sides of the wheel, and is then passed downward beneath the hook 11. The outer portion of the loop is drawn downward and engaged with the hook 10, the spring $8^a$ acting to force the sleeve 9 outward and thus draw inward on the loops 14, and draw inward upon the shield sections 12. By this means the shield sections are held in close contact with the tread of the tire, and yet are permitted to have a sufficient movement to easily conform to any deflection in the tire. At the same time the shields being connected to the hooks 11 which are rigidly attached to the ring 6 are prevented from any longitudinal shifting or creeping along the resilient tire, as would be the case were these shields merely strapped or otherwise attached around the tire and rim.

In order to provide for a proper inflation of the resilient tire 5 any one of the posts 8 may be hollow so that the tube and valve through which the tire is inflated can be extended out through the center of the post, the post being provided with a cap to fit over the end thereof and close it. A hollow post for this purpose is shown in Fig. 1 and is designated by the numeral 15.

By reason of the fact that the shields 12 are drawn against the tire by means of the springs 8ª, the plates will be always held in full engagement with the tread of the tire, whether the tire is fully inflated or not, and it will also be seen that as the resilient tire is compressed by the weight of the vehicle in traveling over the ground that the springs will draw the shields into close contact with the tread of the wheel, which would not be the case were the shield plates not provided with resilient means for holding them in contact with said tread.

In the practical operation of my improved tire protector, the protecting shields are placed in position before the tire is inflated, the ring plate being inserted over the spokes as previously described, and the shields connected by the lateral loops 14 to the hooks 10 and 11. After the shields are in place the tire is inflated to the proper degree, thus compressing the springs 8ª to the exact extent required.

My improved tire protector will save wear on the pneumatic tire, and at the same time will secure the same cushioning action which is obtained in the plain rubber pneumatic tire. It will increase the life of the rubber tires, and even though one plate or shield of the protector should wear through, it does not necessitate an entire new set of protecting shields, but merely the substitution of a new plate for the old. It will further be seen that the system of springs and loops 14 devised by me keeps the shields tight against the face of the tire at all times, whether the tire is blown up to its full extent or only partially inflated. These shields being at all times drawn tightly against the face of the tire and prevented from any longitudinal movement, the tire will not be worn by the plates slipping back and forth, neither will the plates make any noise as they are never loose.

While I have shown what I believe to be the preferred form of my invention, I do not wish to be limited to the exact details of construction or precise arrangement of parts as it is understood that many changes might be made without departing from the spirit of my invention.

In Fig. 5 I show a slightly modified manner of attaching the shields to the ring plate 6. In this form of the device the ring plate 6 is provided with a pair of hooks 16 which are the same as the hooks 11, previously described, but are located on each side of the post 8, thus placing each hook 16 on the ring plate just inside of each hook 13 on the shields 12, thus causing the wire cable or loop 14 to hold the plates apart and prevent any tendency of the plates to shift toward each other.

What I claim is:

1. A tire protector comprising a plurality of pairs of laterally curved shields formed with outwardly turned hooks on their sides, a plurality of pairs of oppositely disposed spring-controlled hooks mounted inside the felly, a plurality of pairs of fixed hooks supported on the sides of the felly but outwardly of the spring-controlled hooks, and flexible connections extending between the sides of each pair of said shields, the fixed hooks and the spring-controlled hooks.

2. A tire protector, comprising an annular member adapted to be placed within the rim of a wheel and laterally slotted to accommodate the spokes of the wheel, a plurality of inwardly projecting radial posts on the inside face of the annular member, springs surrounding said posts, sleeves surrounding the posts and provided with laterally extending hooks and shiftable on the posts against the force of said springs, hooks on the annular member, a plurality of shields adapted to surround the tread surface of the tire, and flexible connections between each of said shields, the hooks on the annular member and the hooks on said sleeve.

3. A tire protector, comprising an annular member laterally slotted to accommodate the spokes of a wheel, said annular member being adapted to be inserted within the rim of a wheel, inwardly projecting radial posts on the annular member spaced midway between said slots, springs surrounding each of said posts, a sleeve on each post movable against the springs and having laterally disposed hooks extending toward the annular member, laterally disposed hooks on the annular member, a plurality of tread shields adapted to protect the tread of a pneumatic tire and having laterally disposed hooks thereon, and flexible loops disposed on each side of the tire and connecting the lateral hooks of two adjacent shields to the corresponding hook on the annular member and the corresponding hook on the movable sleeve.

In testimony whereof, I affix my signature in presence of two witnesses.

CHARLES R. RAGSDALE. [L. S.]

Witnesses:
  GERTRUDE C. RAGSDALE,
  JOHN T. RAGSDALE, Sr.